Aug. 5, 1952 — R. J. OLANDER — 2,606,018
FRICTION SNUBBER FOR RAILWAY CAR TRUCKS
Filed Aug. 16, 1950
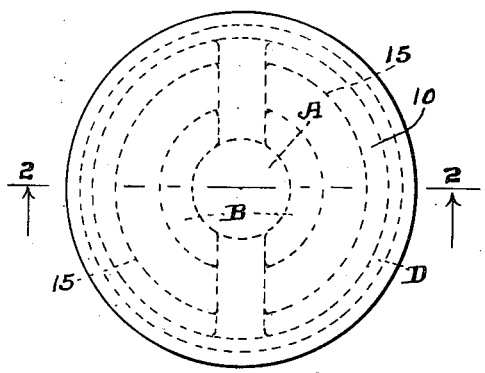
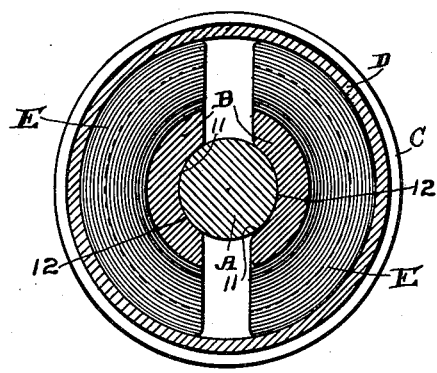
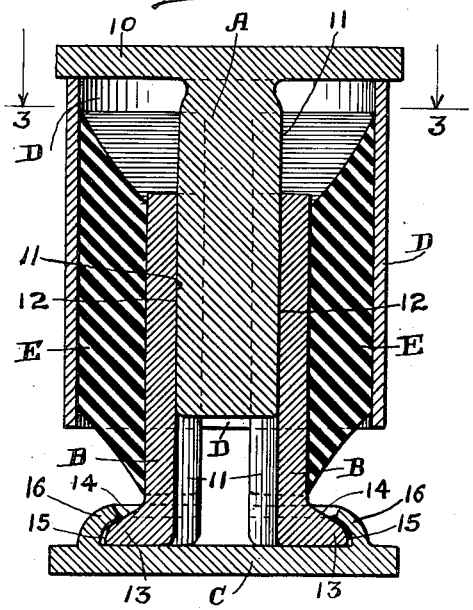
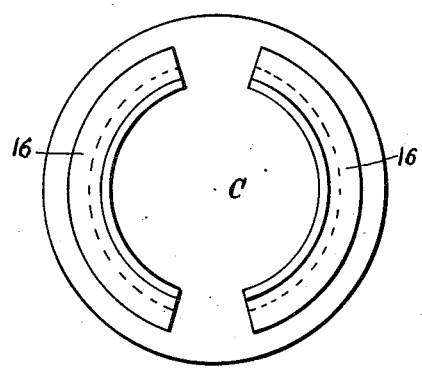
Inventor:
Roland J. Olander.
By Henry Fuchs
Atty.

UNITED STATES PATENT OFFICE 2,606,018

FRICTION SNUBBER FOR RAILWAY CAR TRUCKS

Roland J. Olander, Chicago, Ill., assignor to W. H. Miner, Inc., Chicago, Ill., a corporation of Delaware Application August 16, 1950, Serial No. 179,788

6 Claims. (Cl. 267—9)

This invention relates to improvements in friction shock absorbers, especially adapted for use in connection with truck springs for railway cars, for snubbing the action of the springs.

One object of the invention is to provide a friction shock absorber of the character indicated, comprising a friction post and friction shoes slidable on the post, wherein a yielding means is provided for both opposing relative lengthwise movement of the shoes and post and forcing the shoes into tight frictional engagement with the post.

A further object of the invention is to provide a mechanism as set forth in the preceding paragraph, including a tubular casing which is lengthwise movable with respect to the shoes, and wherein the yielding means is in the form of a rubber member confined within the tubular casing and interposed between the interior walls of the latter and the shoes, and is laterally expanded during lengthwise compression of the mechanism to force the shoes against the post.

A more specific object of the invention is to provide, in a mechanism as hereinbefore set forth, a rubber member of the character indicated which is vulcanized at its inner and outer sides to the shoes and casing, and is thus placed under shear as the tubular member and shoes are moved lengthwise with respect to each other during compression of the mechanism.

Other objects of the invention will more clearly appear from the description and claims hereinafter following.

In the accompanying drawing forming a part of this specification, Figure 1 is a top plan view of my improved shock absorber. Figure 2 is a vertical sectional view, corresponding substantially to the line 2—2 of Figure 1. Figure 3 is a horizontal sectional view, corresponding substantially to the line 3—3 of Figure 2. Figure 4 is a top plan view of the bottom follower shown in Figure 2.

As illustrated in the drawing, my improved friction shock absorber comprises broadly an upper friction post A, a pair of lower friction shoes B—B, a bottom follower C, a tubular casing D, and a pair of rubber elements E—E interposed between the casing and shoes.

The post A is in the form of a solid cylindrical member having a follower plate 10 at its upper end formed integral therewith. The follower plate 10 is in the form of a heavy disc. The post A presents transversely curved, lengthwise extending friction surfaces 11—11 at the opposite sides thereof.

The shoes B—B are disposed at opposite sides of the post A, each shoe being in the form of an elongated, transversely curved plate having a transversely curved friction surface 12 on its inner side, slidingly engaged with the corresponding friction surface 11 of the post A. At its lower end, each shoe has a laterally outwardly projecting, arc-shaped flange 13, provided with an inclined top surface 14 and a rounded outer edge section 15.

The bottom follower C is in the form of a heavy disc, corresponding in diameter to the follower plate 10. The two shoes B—B are supported on the follower C and the latter has arcuate, inwardly curved, upstanding retaining flanges 16—16 at opposite sides thereof engaged respectively over the flanges 13—13 of the shoes B—B to connect the shoes to the follower C and hold the same against upward movement with respect to said follower.

The tubular casing D is of circular outline and of slightly smaller diameter than the follower plate 10 of the post A. The casing D is open at its top and bottom ends, surrounds the post A and shoes B—B, and has its upper end bearing on the underneath side of the follower plate 10.

The two rubber elements E—E are arranged at opposite sides of the mechanism, between the shoes B—B and the interior side walls of the casing D. Each element E is in the form of a transversely curved pad, having its inner side fixed to the corresponding shoe B, and its outer side fixed to the inner wall of the casing D, the rubber pads being preferably vulcanized to the same. Each element E is of the vertical, transverse, cross sectional shape shown in Figure 2. The side of the element E, which is secured to the shoe, is of a length to extend approximately from the top end of the shoe to the flange 13 at the bottom end thereof, and the side of said element E, which is secured to the casing D, extends approximately from the lower end of the casing to within a short distance of the upper end thereof. The top and bottom sides of each element E are inclined, as shown in Figure 2, and preferably bowed inwardly to a slight degree. In the assembled condition of the mechanism, the rubber elements E—E are preferably under initial compression between the casing D and the shoes B—B to hold the shoes against the post A, and are also under stress in lengthwise direction to hold the casing D seated on the follower plate 10 of the post A. In the normal full release position of the shock absorber, the parts are in the positions shown in Figure 2, the upper ends of the shoes being spaced from the follower plate 10 of the post A, and the lower ends of the post A and casing D being spaced from the bottom follower C.

My improved friction shock absorber preferably replaces one or more of the spring units of a truck spring cluster, the same being interposed between the usual top and bottom spring plates of the truck spring cluster, and compressed with the truck springs as the spring plates approach each other in service.

The operation of my improved shock absorber is as follows: Upon the spring cluster of the truck of a car being compressed between the spring follower plates of said cluster, the friction shock absorber is compressed therewith between said plates, forcing the post A and the casing D downwardly with respect to the shoes B—B. Downward movement of the post A and the casing D is yieldingly opposed by the rubber elements E—E, the latter being distorted and placed under shear. Distortion of the elements E—E yieldingly opposes relative lengthwise movement of the post A toward the shoes B—B, and expansion of said elements during said distortion forces the shoes laterally inwardly into tight frictional contact with the post A. High frictional resistance is thus produced between the shoes B—B and the post A to snub the action of the truck springs. As will be evident, during this action of the device, slight tilting of the shoes with respect to the follower C is permitted by the loose connection between said shoes and this follower, thereby compensating for rocking displacement of the top and bottom followers with respect to each other, whereby the shoes will be maintained in true surface contact with the friction surfaces of the post A.

As the spring follower plates of the truck spring cluster are separated, due to recoil of the springs, the follower C and the follower plate 10 are moved apart lengthwise of the mechanism by the resilient action of the rubber elements E—E in returning to their original state.

I claim:

1. In a friction shock absorber, the combination with a friction post; of friction shoes lengthwise slidable on said post; a casing surrounding said post and shoes, said casing being movable in unison with said post lengthwise toward said shoes; and rubber pads under lateral compression interposed between said shoes and casing, said rubber pads having their inner and outer sides vulcanized to said shoes and casing, respectively.

2. In a friction shock absorber, the combination with a friction post; of friction shoes lengthwise slidable with respect to the post; a casing surrounding said post and shoes, said casing being engaged by and movable lengthwise with the post toward said shoes; and rubber pads interposed between said shoes and casing, said pads being secured at opposite sides to the outer sides of said shoes and the inner side of said casing.

3. In a friction shock absorber, the combination with end followers movable toward and away from each other lengthwise of the mechanism; of a friction post carried on one of said followers extending toward the other follower; friction shoes bearing at their outer ends on said other follower, said shoes embracing the post at opposite sides; a casing surrounding said post and shoes and bearing at its outer end on the follower which carries said post; and a rubber pad interposed between the interior wall of the casing and each of said shoes, said pads being under initial lateral compression and having their outer sides vulcanized to said casing and their inner sides vulcanized to said shoes.

4. In a friction shock absorber, the combination with a follower; of a second follower, said followers being movable toward and away from each other lengthwise of the mechanism; a post on said first named follower projecting toward said second named follower; friction shoes embracing said post at opposite sides and having their outer ends bearing on said second named follower; a pair of rubber pads at opposite sides of the mechanism, each pad having the inner side thereof vulcanized to the shoe at the corresponding side of the mechanism; and a casing surrounding said pads and having its inner wall bearing on said pads, said pads being vulcanized to said inner wall, said casing having its outer end abutting said first named follower.

5. In a friction shock absorber, the combination with top and bottom followers; of a top friction post depending from said top follower; a pair of friction shoes embracing said post at opposite sides in lengthwise sliding contact therewith, said shoes having their bottom ends supported on said bottom follower; a casing surrounding said post and shoes and having its top end abutting said top follower; and a pair of rubber pads interposed between the inner side wall of the casing and said shoes, in contact with the same, and having the sides thereof which contact the shoes and casing fixedly secured to the same.

6. In a friction shock absorber, the combination with top and bottom followers; of a top friction post depending from said top follower; a pair of friction shoes embracing said post at opposite sides in lengthwise sliding contact therewith, said shoes having their bottom ends supported on said bottom follower; flanges on the bottom ends of the shoes; flanges on said bottom follower engaged over the flanges of said shoes; a casing surrounding said post and shoes and having its top end abutting said top follower; and a pair of rubber pads interposed between the inner side wall of the casing and said shoes, in contact with the same, and having the sides thereof which contact the shoes and casing fixedly secured to the same.

ROLAND J. OLANDER.

REFERENCES CITED

The following references are of record in the file of this patent:

UNITED STATES PATENTS

| Number | Name | Date |
| --- | --- | --- |
| 1,442,893 | Lewis | Jan. 23, 1923 |
| 1,555,697 | O'Connor | Sept. 29, 1925 |
| 1,713,914 | O'Connor | May 21, 1929 |
| 2,295,556 | Flesch | Sept. 15, 1942 |
| 2,352,030 | Sproul | June 20, 1944 |